No. 646,176. Patented Mar. 27, 1900.
G. HIMMEL.
SPECIFIC GRAVITY APPARATUS.
(Application filed Apr. 12, 1898.)
(No Model.)
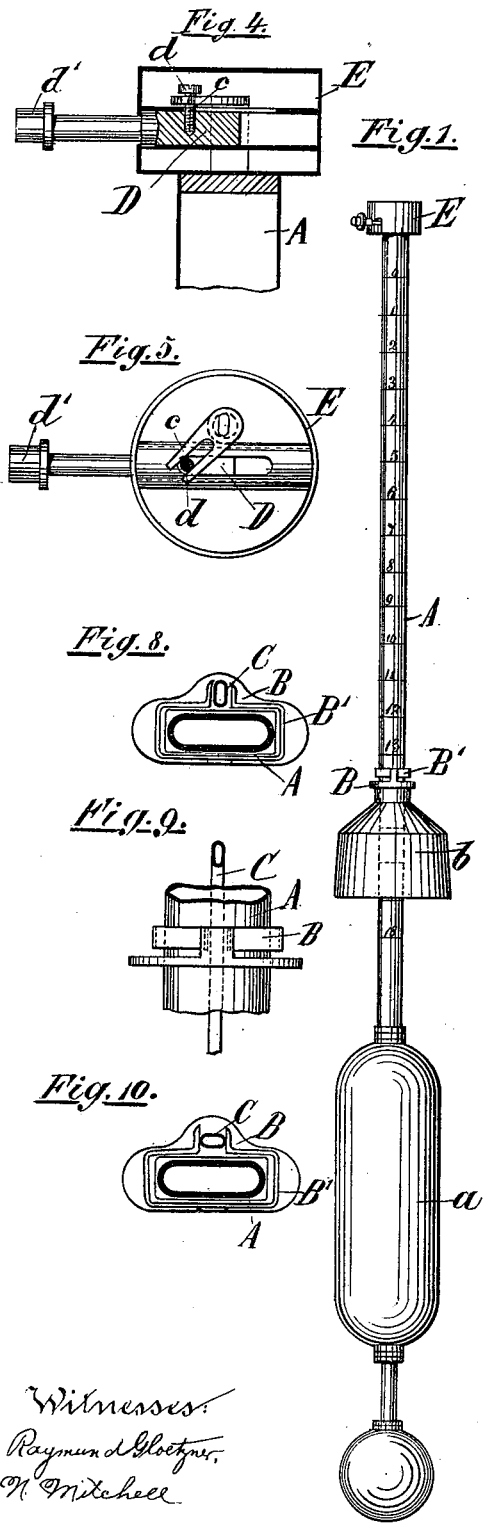
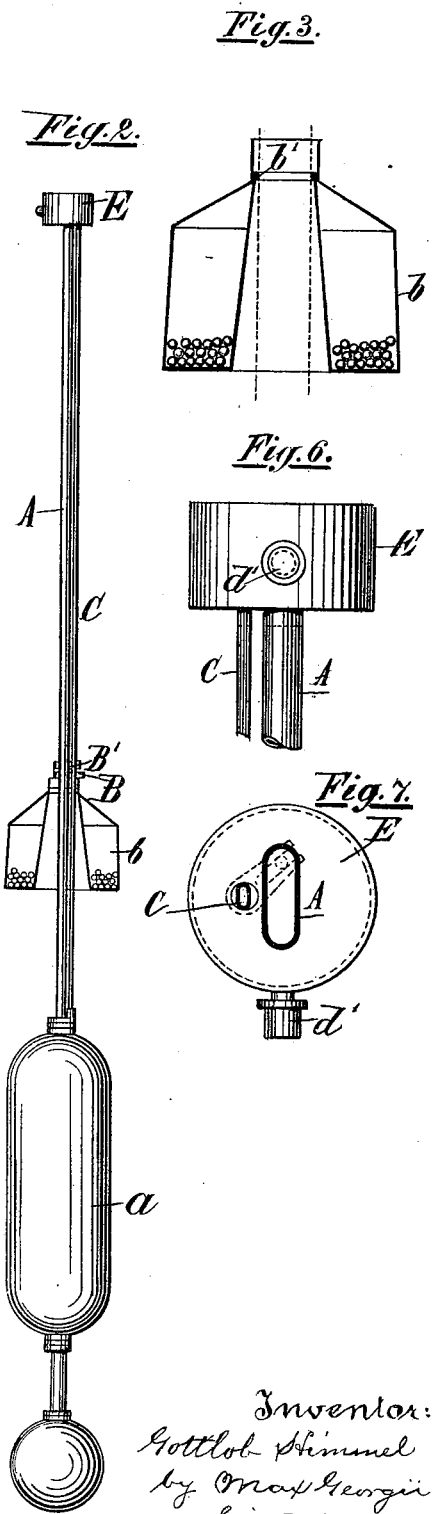
Witnesses:
Raymund Gloetzner
N. Mitchell
Inventor:
Gottlob Himmel
by Max Georgii
his attorney

UNITED STATES PATENT OFFICE.

GOTTLOB HIMMEL, OF TÜBINGEN, GERMANY.

SPECIFIC-GRAVITY APPARATUS.

SPECIFICATION forming part of Letters Patent No. 646,176, dated March 27, 1900.

Application filed April 12, 1898. Serial No. 677,366. (No model.)

*To all whom it may concern:*

Be it known that I, GOTTLOB HIMMEL, a citizen of the Empire of Germany, residing at Tübingen, in the Kingdom of Würtemberg, Germany, have invented a certain new and useful Improvement in Hydrometers or Gages for Liquids; and I do hereby declare the following to be a full, clear, and exact description of the invention, such as will enable others skilled in the art to which it appertains to make and use the same.

My invention relates to hydrometers or gages for liquids; and it consists, substantially, in such features of improvements as will hereinafter be more particularly described.

In order to ascertain the saccharine contents of beer-worts, a hydrometer is, as is well known, at present employed, which is immersed in a glass vessel filled with worts drawn from the boiling-pan or the fermenting-vat in order that the percentage of the worts may be read off on the said hydrometer above the level of the liquid; but the reading off with these comparatively-small hydrometers made of glass is mostly inexact, partially owing to the small divisions in the scale and partially owing to the foam or froth that always floats on the worts.

The above-mentioned drawbacks are removed by the hydrometer or worts-tester forming the object of the present invention and which is shown in the accompanying drawings.

Figure 1 is a front view, and Fig. 2 a side view, partly in section, while Figs. 3 to 10 are details of construction, which will be hereinafter described.

This improved worts-testing device is not formed of glass, but of metal, so that it is much more durable in practical working, and may be made of any suitable size, so that one degree has, for instance, a length of from thirty to forty millimeters as against six to seven millimeters in the present glass instruments, which in itself of course greatly facilitates the reading off. The improved worts-tester is, however, so arranged that it allows of the reading off being effected directly in the pan or fermenting-vat. For this object a separate indicator B is mounted freely adjustable on the scale A of the testing device, which indicator rests on a float $b$, which also loosely incloses the scale A. Fig. 3 shows a longitudinal section, on an enlarged scale, of the float $b$, which is so weighted that the upper edge of the indicator B when the meter is immersed in the liquid to be measured always lies above the plane of the surface of the liquid. In this manner the reading off with the new apparatus does not take place on the surface of the liquid, the position of which, in consequence of foam and adhesion, is always difficult to determine, but in a much easier and more exact manner above the indicator B, the position of which cannot be rendered difficult to ascertain either through foam or adhesion. The float touches the scale A only at two points with its inner projecting ring $b'$, Fig. 3—that is to say, with the least possible friction. As the float $b$ keeps the indicator B on the surface of the liquid, while the float $a$ floats in the liquid, an alteration in the specific gravity of the liquid which causes a sinking or rising of the float $a$ to the extent of a degree of the scale A has for consequence a movement of the float $b$ at most of from one to two millimeters—that is to say, it amounts to only one-twentieth or one-fortieth of the movement of the scale—in case the length of the rod of the same is, for instance, forty millimeters—that is to say, there results through the comovement of the float $b$ an error which may be practically disregarded. As, however, the division of the scale A is determined equally by means of the float $b$, this error is entirely avoided. In this manner by means of the indicator B, carried by the float $b$, the hitherto so-difficult reading off of the degrees in testing worts is entirely removed and the same may be directly ascertained in the boiler or in the fermenting-vat. In order, however, to render this reading off still more convenient, this improved worts-testing device is also provided with the following arrangement: On the rear side of the scale A there runs a flat bar C, revoluble on its longitudinal axis, the upper end of which bar engages by means of a fork $c$ a pin or screw $d$ of a carriage D, horizontally movable to and fro in a case E on a handle $d'$, as shown in Figs. 4 and 5 in vertical section and plan view, the lid of the case E being removed. According as the handle $d'$ is drawn out of the case E, Figs. 4 and 5, or pushed into the case E, Figs. 6 and 7, which represent a front view and view from beneath of the case E, the larger diameter of the cross-section of the bar C stands either vertical or parallel to the plane of the scale A, and in the first case the bar C passes freely between the jaws of a spring-clamp B', fixed on the indicator B, Figs. 8 and 9, while in the latter case the bar C pushes the clamps B' apart, so that they clamp themselves on the said bar. If the apparatus with the handle d' drawn out has been immersed in the liquid which is to be tested, the float b will raise the indicator B, with the clamp B', up to the degree of the scale A corresponding to the specific gravity. If then the handle d' be pushed into the casing E, the indicator B will by means of its clamp B', as already explained, clamp the bar C firmly in its then position on the scale and the specific gravity can be conveniently read off after the removal of the apparatus from the liquid. Of course in this case the arrangement is such that the reading off takes place above the clamp B'.

The improved worts-tester hereinbefore described may of course have any suitable division of the scale, according to Balling, Lang, Kaiser, or the like from 0° up to 18°, or may only show such figures as are desired by the person ordering it. The length of the separate degrees of the scale may of course, as already stated, be made of any suitable size. Finally the back of the scale A may also be divided into degrees arranged for beer-worts of 4° Réaumur before use, so that with the same instrument both boiling beer-worts and also four-per-cent. beer-worts ready for use may be tested.

Having thus fully described my invention, what I claim as new, and desire to secure by Letters Patent, is—

1. In a hydrometer, or the like, the combination, with a buoyant scale, a float movable with relation thereto, and an indicator carried by said float, of a stop device acting on the indicator and arranged to lock it to the scale.

2. In a hydrometer, or the like, the combination, with a buoyant scale, and a revoluble flattened bar carried by the scale, of an indicator movable with relation to the scale, and clamp-jaws attached to the indicator and arranged to engage the revoluble bar when the latter is rotated in one direction and to release the bar when rotated in the other direction, whereby the indicator may be fixed to the scale at the desired point.

3. In a hydrometer, or the like, the combination, with a scale, a revoluble bar carried by the scale, and an indicator movable with relation to the scale, of means carried by the indicator and operated by the revoluble rod for locking the indicator with relation to the scale, a transversely-movable carriage arranged to rotate the rod, and a handle for operating the carriage.

In testimony whereof I affix my signature in presence of two witnesses.

GOTTLOB HIMMEL.

Witnesses:
AUGUST DRAUTZ,
N. WAGNER.